United States Patent
Chandrasekara et al.

(10) Patent No.: US 10,520,054 B2
(45) Date of Patent: Dec. 31, 2019

(54) MOTOR BRAKE SYSTEM

(71) Applicant: Rockwell Automation Technologies, Inc., Mayfield Heights, OH (US)

(72) Inventors: Chetan Chandrasekara, Chanhassen, MN (US); Arun K. Guru, Brookfield, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 122 days.

(21) Appl. No.: 15/720,413

(22) Filed: Sep. 29, 2017

(65) Prior Publication Data
US 2019/0101175 A1 Apr. 4, 2019

(51) Int. Cl.
| | |
|---|---|
| *F16D 66/02* | (2006.01) |
| *G01M 13/028* | (2019.01) |
| *F16D 49/02* | (2006.01) |
| *G01L 5/28* | (2006.01) |
| *G01M 7/00* | (2006.01) |
| *F16D 55/00* | (2006.01) |
| *F16D 65/18* | (2006.01) |

(Continued)

(52) U.S. Cl.
CPC ............ *F16D 66/024* (2013.01); *F16D 49/02* (2013.01); *G01L 5/28* (2013.01); *G01M 7/00* (2013.01); *G01M 13/028* (2013.01); *F16D 65/186* (2013.01); *F16D 66/02* (2013.01); *F16D 2055/0033* (2013.01); *F16D 2066/003* (2013.01); *F16D 2066/005* (2013.01); *F16D 2121/22* (2013.01); *G05B 2219/41279* (2013.01)

(58) Field of Classification Search
CPC ........ F16D 66/024; F16D 49/02; F16D 65/16; F16D 65/18; F16D 65/0006; G01M 13/028; B60T 8/368; B60T 8/4081; B60T 8/4031; B60T 8/34; B60T 8/344
See application file for complete search history.

(56) References Cited

U.S. PATENT DOCUMENTS 5,372,221 A * 12/1994 Jalbert .................... B60T 17/22
188/1.11 L
5,952,564 A * 9/1999 Naito ..................... B60T 8/173
73/115.01

(Continued)

FOREIGN PATENT DOCUMENTS

EP 3 023 846 A1 5/2016

*Primary Examiner* — Helen C Kwok
(74) *Attorney, Agent, or Firm* — FaySharpe LLP

(57) ABSTRACT

A motor includes a brake diagnostics system with sensors to assess the brake assembly condition. Acoustic or other vibration sensors provide vibration data that is compared to known vibration spectrum data to compare the condition of the brake assembly to a properly functioning brake assembly. The brake diagnostics system monitors current flow in the brake coil to assess the condition of the brake assembly. The sensed brake coil current is compared to known coil current spectrum data to compare the condition of the brake assembly to a properly functioning brake assembly. The voltage input to the brake coil is varied depending upon the current sensed in the brake coil to minimize heat in the brake coil. The motor also includes a resilient layer of thermally conductive material located between the brake assembly and the housing that provides a continuous, uninterrupted thermal pathway between the brake assembly and the motor housing.

20 Claims, 7 Drawing Sheets

(51) Int. Cl.
*F16D 66/00* (2006.01)
*F16D 121/22* (2012.01)

(56) References Cited

U.S. PATENT DOCUMENTS

| | | | |
|---|---|---|---|
| 6,202,804 B1 | 3/2001 | Dropmann et al. | |
| 6,802,402 B2 | 10/2004 | Bausch et al. | |
| 8,245,609 B1* | 8/2012 | Greenwald | B23B 5/04 82/1.11 |
| 8,782,877 B2 | 7/2014 | Gebhart | |
| 8,985,283 B2* | 3/2015 | Oshio | B22D 19/0081 188/72.4 |
| 2003/0010583 A1* | 1/2003 | Arnold | B60T 8/00 188/106 R |
| 2005/0205712 A1* | 9/2005 | Aisenbrey | B29C 45/0013 242/422.2 |
| 2007/0163851 A1* | 7/2007 | Alexander | F16D 55/22 188/264 F |
| 2010/0030490 A1* | 2/2010 | Wright | F16D 66/02 702/34 |
| 2010/0250081 A1* | 9/2010 | Kinser | B60T 8/00 701/70 |
| 2011/0226105 A1* | 9/2011 | Butler | B27B 5/222 83/62 |
| 2012/0146333 A1* | 6/2012 | Bywaters | F03D 7/0248 290/44 |
| 2012/0285777 A1* | 11/2012 | Oshio | B60T 8/00 188/72.1 |
| 2013/0277157 A1* | 10/2013 | Huang | B22D 19/0081 188/72.4 |
| 2014/0095037 A1* | 4/2014 | Seto | B60W 10/00 701/67 |
| 2014/0367967 A1* | 12/2014 | Ossyra | B29C 45/0013 242/422.2 |
| 2018/0251103 A1* | 9/2018 | Satterthwaite | F16D 55/22 188/264 F |

* cited by examiner

MOTOR BRAKE SYSTEM

BACKGROUND INFORMATION

The present development is described with primary reference to servo motors, but is applicable to other types of motors. Accordingly, it is not intended that the present development be limited to servo motors unless specified as such.

Rotary servo motors and other motors are widely known and used to provide rotary motion control for industrial machinery and other applications. A rotor rotates relative to a stator in response to control input commands from a motor drive. An output shaft of the servo motor is operably connected to the rotor to rotate therewith. The output shaft projects outwardly from or is otherwise accessible at the motor housing at a front end. A position and/or speed feedback device, often referred to as an "encoder," is operatively associated with the output shaft of the motor at an opposite rear end of the motor housing and provides feedback to the motor drive as to the angular position of the output shaft and rotor such that rotation of the output shaft is further controlled in response to the feedback to obtain a precise desired angular position for the rotor and output shaft connected thereto. Servo motors often further include a holding brake that is selectively applied after the rotor is stopped in the desired angular position to hold the output shaft and rotor in such desired angular position and/or a motor can include a stopping brake used to stop rotation of the rotor and components connected thereto.

FIG. 1 shows such a conventional servo motor M' comprising a housing H' with a front wall FW', a rear wall RW', and a side wall SW' that can be rectangular, cylindrical or otherwise shaped in cross-section and that extends axially between and interconnects the front wall FW' and rear wall RW'. Between the front wall FW', rear wall RW' and side wall SW', the housing defines a hollow interior space SP' in which a stator ST' is supported. A rotor RT' is rotationally supported inside the stator ST', and the rotor RT' is operably coupled to an output shaft OS' such that the output shaft OS' rotates directly or indirectly with the rotor RT' when the motor is energized. The output shaft OS' extends axially or longitudinally in the motor housing H' along a longitudinal axis X' and is rotationally supported by a front bearing FB' located adjacent the front wall FW' and a rear bearing RB' that is spaced inwardly or rearwardly toward the rear wall RW' with respect to the front bearing FB'. The front bearing FB' is typically located in a front end cap. The output shaft OS' extends outside of the housing space SP' through the front wall FW' of the motor housing H' and is adapted to be operably coupled to an associated machine or other structure to be rotated by the output shaft OS'. The motor housing H' extends axially or longitudinally along the longitudinal axis X' of the output shaft OS', and the motor housing H' includes a mid-point MP' located halfway between the front wall FW' and rear wall RW' along the longitudinal axis X'.

The motor housing H' includes a front end FE' adjacent the front wall FW' and includes a front region FR' that extends between the front wall FW' and the housing midpoint MP'. Similarly, the motor housing H' includes a rear end RE' adjacent the rear wall RW' and includes a rear region RR' that extends between the rear wall RW' and the housing midpoint MP'. The motor housing H' includes one or more mounting flanges MF' or other mounting structures located adjacent the front end FE' including apertures defined therein for receiving respective fasteners for securing the housing to an associated machine or other support T' for use of the motor M'. In certain installations, as shown in FIG. 1, the rear end RE' of the motor housing H' is unsupported by an associated mounting structure such that the rear end RE' and rear region RR' of the housing are cantilevered relative to the front end FE' of the housing.

The output shaft OS', which comprises a single shaft or multiple interconnected shaft portions, is rotationally supported in the interior space SP' of the motor housing H' by a front bearing FB' located in the front region FR' of the housing H' and by a rear bearing RB' located in the rear region RR' of the housing. The motor M' further comprises a position and/or speed feedback device such as an encoder E' located in the housing rear region RR' and operatively associated with the output shaft OS'. The encoder E' senses or detects the angular position of the output shaft OS' as the output shaft rotates about the axis X'. The motor M' comprises an electrical power and data connector C' for communicating power to the windings of the stator and for communicating data between the encoder E' and an associated motor drive system through one or more associated cables, such as a single cable that includes multiple separate conductors for powering the windings of the motor, for controlling the brake assembly BA', and for carrying feedback data and temperature data. The connector C' can be provided as part of a removable cap that covers the encoder E'. A wall (not shown) separates the encoder E' from the rear bearing RB'. In one example, a rear end cap is connected to the housing H' and holds the rear bearing RB' on an inner side and holds the encoder or other feedback device E' on the opposite outer side.

The motor M' further comprises a brake or brake assembly BA' for selectively braking or holding the output shaft OS' so that the output shaft OS' is prevented from rotating and held in a fixed angular position when the brake assembly BA' is engaged. The brake assembly BA' is located in the housing rear region RR' near the rear bearing RB' and encoder E', and can be fixedly secured to a rear end cap. The location of the brake assembly BA' in the rear region RR' of the motor housing H' has been deemed to be suboptimal in certain instances because the brake assembly BA' generates significant heat and brake dust that can degrade the performance and lifespan of the encoder E'. Also, the mass of the brake assembly BA' located in the cantilevered rear region RR' of the motor housing H' can lead to increased vibrations in the output shaft OS' and motor M' overall.

In a typical arrangement, as shown in FIG. 2, the brake or brake assembly BA' comprises a brake housing 10' that secured to the motor housing H' in the space SP' by one or more fasteners. The brake housing 10' includes a base 12' and a backing plate 14' that is secured to the base 12' by a plurality of fasteners 14f' (only one fastener 14f' is shown in FIG. 2) such that the backing plate 14' is axially spaced from the base 12'. Both the base 12' and backing plate 14' annular in general structure, and the motor output shaft OS' extends coaxially through both the brake assembly base 12' and backing plate 14'. A brake hub 20' is keyed, splined, or otherwise connected to the motor output shaft OS' to rotate therewith, or the hub 20' is integrally provided as part of the output shaft OS'.

The brake assembly BA' further comprises a movable armature 30', typically an annular plate structure that is coaxially located about the hub 20' and output shaft OS', but that is axially movable along the longitudinal axis X' of the output shaft OS'.

The brake assembly BA' also includes one or more springs 36' operably positioned in the base 12' that operate between the base 12' and the armature 30' to continuously bias and urge the armature 30' toward its engaged position, away from the base 12' and toward the backing plate 14'. The spring(s) 36' can comprise a plurality of axially extending coil springs arranged circumferentially about the base 12' or can comprise another spring arrangement such as, e.g., a disc spring coaxially positioned about the output shaft OS' between the base 12' and the armature 30'. Alternatively, the brake assembly BA' can be a permanent magnet brake assembly in which the spring(s) 36' is replaced by one or more permanent magnets that urge the armature 30' into its engaged position.

An annular brake rotor 40' is engaged with the hub 20'. In particular, the rotor 40' comprises an inner or hub portion 42' that is keyed, splined, or otherwise operably coupled to the hub 20' to rotate with the hub 20' and slide axially relative to the hub 20' such that the brake rotor 40' is axially slidable or movable relative to the hub 20' along the longitudinal axis X'. The rotor 40' is positioned axially between the armature 30' on one side and the backing plate 14' on the other opposite side. Typically, a friction material is included on one or both opposite faces of the rotor 40' and/or on the faces of the armature 30' and/or backing plate 14' that are oriented toward the rotor 40' such that when the rotor 40' is urged by the armature 30' into abutment with the backing plate 14' and the armature 30' clamps the rotor 40' into abutment with the backing plate 14', the rotor 40' is prevented from rotating about the axis X' which prevents the hub 20' and output shaft OS' from rotating about the longitudinal axis X'.

The brake assembly BA' is normally engaged or in its "on" configuration because armature 30' is normally spring-biased by the biasing spring(s) 36' toward and into an engaged position where the armature 30' firmly urges the brake rotor 40' into engagement with the backing plate 14' such that the rotor 40' is tightly captured or sandwiched between the armature 30' and the backing plate 14' (together with the friction material) and such that the rotor 40' is restrained against rotation about the longitudinal axis X' of the output shaft OS'. When the rotor 40' is restrained against rotation, the output shaft OS', itself, is also restrained and prevented from rotating about the longitudinal axis X'.

To release or disengage the brake assembly BA' so that it is in its "off" configuration, the brake assembly BA' further includes at least one electromagnetic coil 50' located in the brake housing base 12'. The coil 50' is selectively energized by the associated motor drive system connected to the motor M' to establish an electromagnetic force about the coil 50'. Because the armature 30' comprises a magnetic metal or other magnetic material, when the coil 50' is energized, the electromagnetic force of the coil 50' draws the armature 30' toward its disengaged position, i.e., toward the brake housing base 12' away from the brake rotor 40' and backing plate 14', into a disengaged or released position against the biasing force of the spring(s) 36' (or against the biasing force of the permanent magnets if used in place of the spring(s) 36'). When the armature 30' is moved into its disengaged position and held in its disengaged position by the electromagnetic force of the coil 50', the brake rotor 40' is released and disengaged from the armature 30' and backing plate 14' and the rotor 40' slides axially away from the backing plate 14' sufficiently to allow the rotor 40' to rotate about the longitudinal axis X', along with the hub 20' and output shaft OS' of the motor M'.

When the brake assembly BA' is a holding or parking brake, the brake assembly BA' is not engaged until the output shaft OS' has stopped rotating or at least substantially stopped rotating, i.e., the brake assembly BA' is typically not used to stop a rotating rotor 40'. The brake assembly BA' is also typically released before the motor M' is again energized to rotate the output shaft OS' so that the brake BA' is never in its engaged or "on" while the output shaft OS' is being rotationally driven. In some cases, the brake assembly BA' acts as a stopping brake that slows and stops the rotor 40' when the brake assembly BA' is engaged.

Motor brakes as described above have heretofore been associated with certain drawbacks. As noted, known brake assemblies BA' are mounted in the rear region RR' of the motor M' near the encoder E'. In some applications, the motor M' is mounted to an the associated support structure by a mounting flange MF' or the like that is located at the front end FE' of the motor, and the opposite rear end RE' of the motor is unsupported and cantilevered outwardly relative to the front end FE'. In such case, the significant cantilevered mass of the brake assembly BA' can sometimes lead to undesired vibration or misalignment of the output shaft OS' during use of the motor M', both of which can lead to operational drawbacks and can increase wear and degrade motor performance and operational life.

Also, a motor brake BA' as described generates significant heat due to the need to energize the brake coil 50' repeatedly to release the brake assembly BA' and to hold the brake assembly BA' in its released position during rotation of the output shaft OS'. Known servo motor brake designs and locations lead to such heat being transmitted to the encoder E', which can degrade performance and lifespan of the encoder E'. Furthermore, such known designs are suboptimal in terms of brake cooling and capture too much heat in the motor housing H'. Also, locating the brake assembly BA' adjacent the encoder E' can cause brake dust to contaminate the encoder which can reduce its life, increase heat, and reduce its lifespan and performance.

In addition, the motor brake assembly BA' and other known designs do not provide desired feedback or diagnostic information about the health and performance of the brake BA', itself, such as brake release, brake dragging, and shorts in the brake coil. As such, an unexpected brake failure can cause an unscheduled malfunction of the motor M', which is highly undesired in applications such as manufacturing, entertainment, transportation, and the like.

Accordingly, it has been deemed important to provide a motor brake system that increases safety of people in fields such as entertainment, manufacturing, and the like through advanced diagnostic monitoring, preventing unexpected failures, improved protection, higher utilization and increased availability of assets. This is especially important for applications where gravity assisted and vertically hanging loads are present, such as in entertainment or in industrial automation applications for packaging, converting, robotics, machine tooling, conveyors, cranes, etc. A need has been identified for improving safety integrity of brake control (improved Safety Integrity Level (SIL) rating), reducing vibration and improving thermal performance of servo motors and other motors. The present development as described below provides the above-noted benefits and advantages and others while providing better overall results. As such, a motor brake must function properly over the life of the motor, and any performance degradation of the motor brake must be identified early to ensure that the motor brake can be monitored and repaired if necessary.

SUMMARY

In accordance with a first aspect of the present development, a motor includes a rotor and stator in a housing. The motor also includes a brake assembly adapted to restrain rotation of the rotor. A brake controller is provided and includes a brake diagnostics system. At least one vibration sensor is located in the housing and provides vibration data to the brake diagnostics system in response to a brake operation cycle of the brake assembly. The vibration data is used by the brake diagnostics system to assess an operative condition of the brake assembly. The vibration data can be acoustic vibration data as detected by a microphone or an ultrasonic acoustic sensor/detector.

In accordance with another aspect of the present development, a motor includes a housing, a rotor, and a stator. A brake assembly is adapted to restrain rotation of the rotor, and the brake assembly includes a brake coil. A brake controller is provided and includes a brake diagnostics system. A brake coil current feedback system is operatively associated with the brake coil and is adapted to sense electrical current flowing through the brake coil. The brake coil current feedback system provides a coil current feedback signal to the brake diagnostics system, and the magnitude of coil current feedback signal indicates a magnitude of the electrical current flowing through the brake coil.

In accordance with a further aspect of the present development, a motor includes a housing. A rotor and stator are located in the housing. A brake assembly is adapted to restrain rotation of the rotor. A resilient layer of thermally conductive material is located between the brake assembly and the housing and provides a continuous, uninterrupted thermal pathway between the brake assembly and the motor housing.

DETAILED DESCRIPTION

Figure 1:
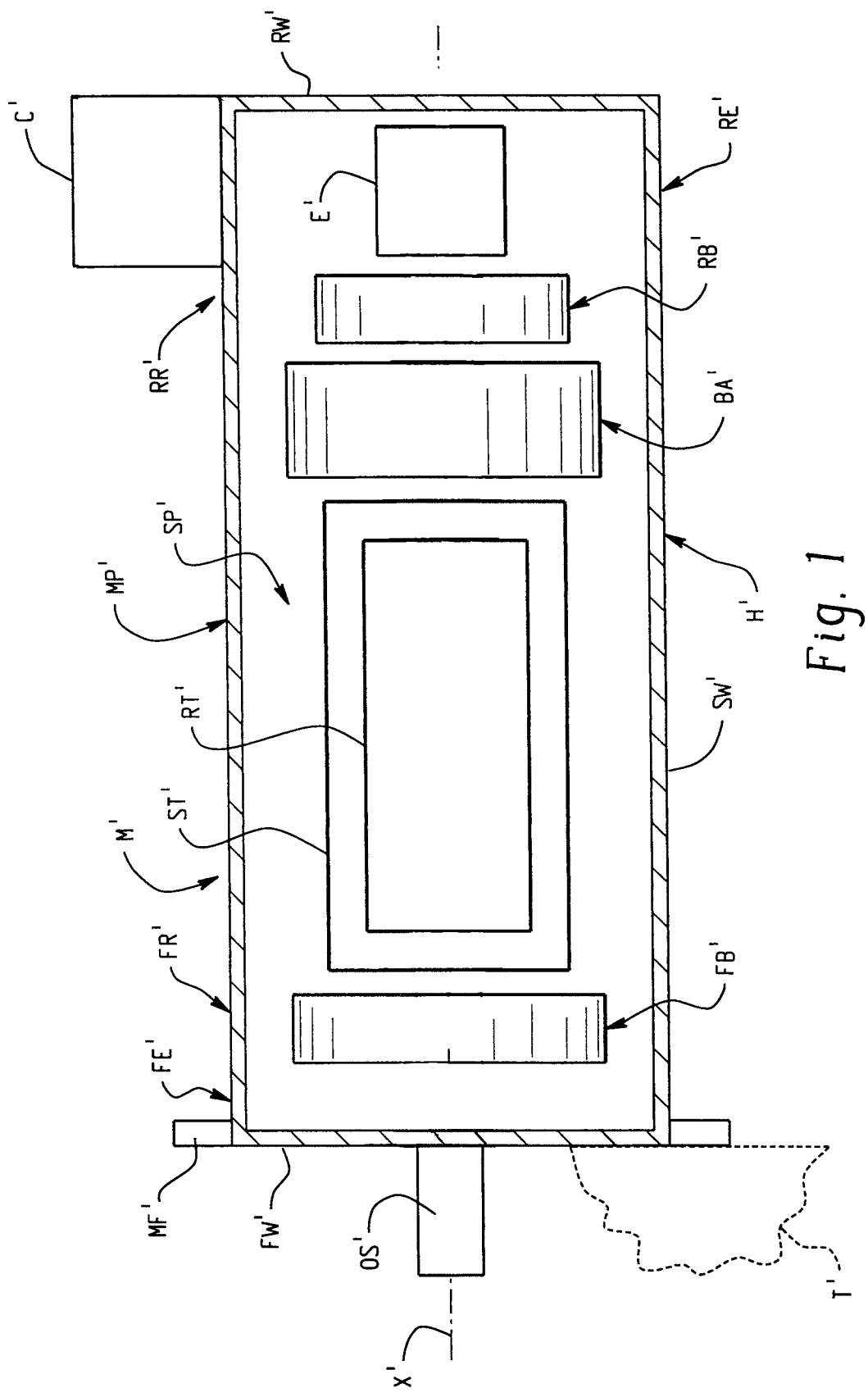
FIG. 1 shows a conventional motor including a brake assembly.
Figure 2:
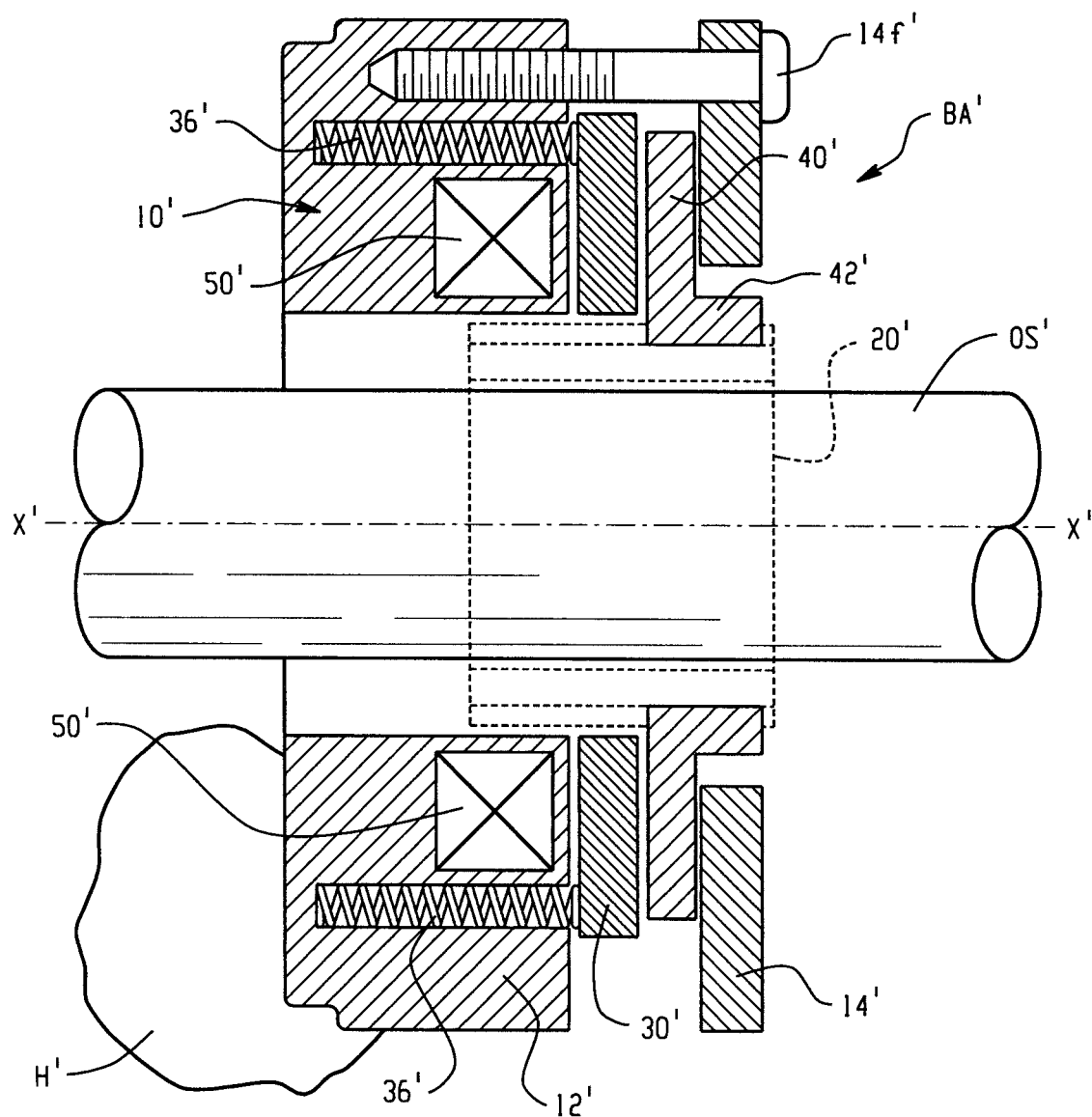
FIG. 2 is an enlarged partial section view of a known brake assembly such as used in the motor of FIG. 1.
Figure 3:
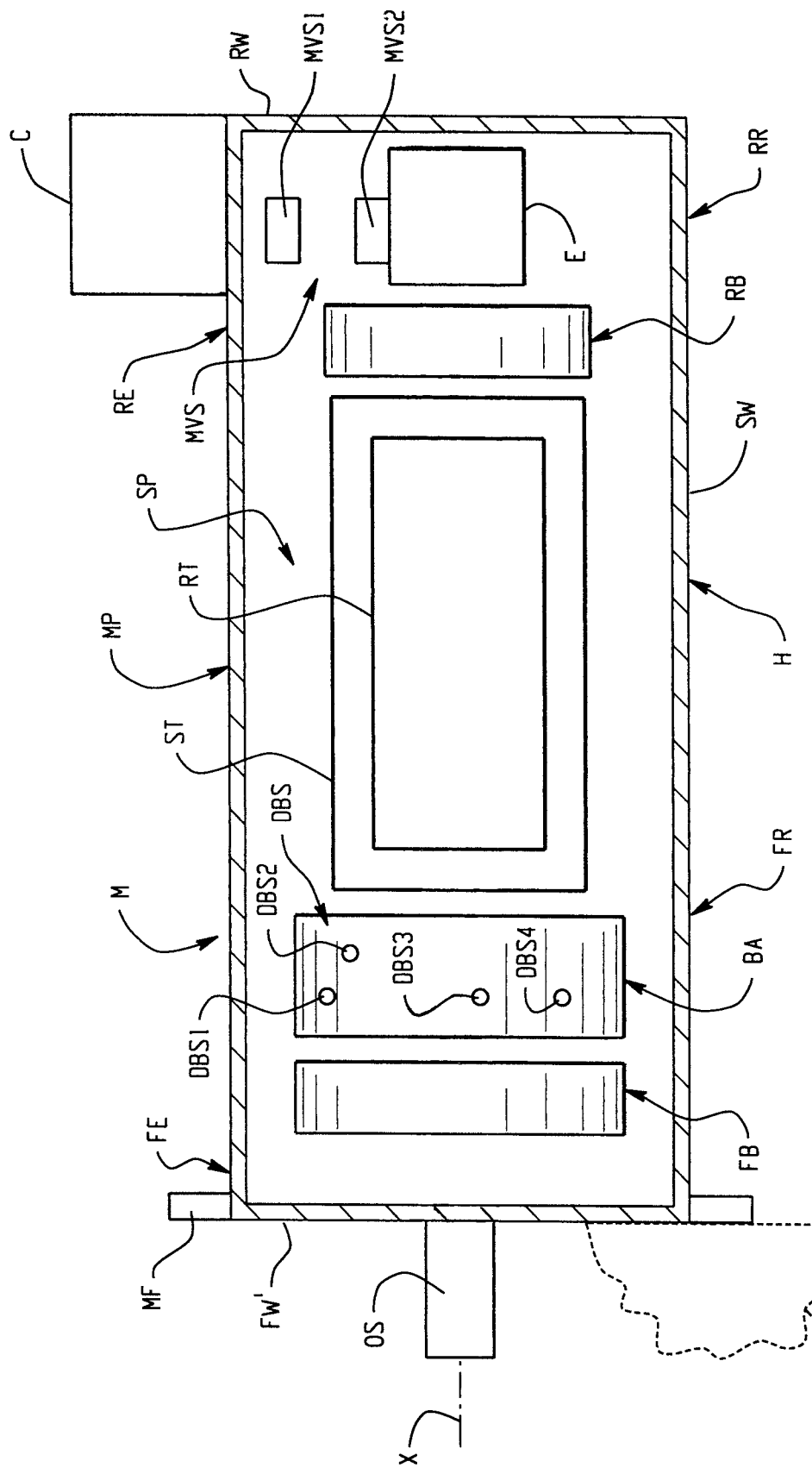
FIG. 3 shows a motor including a brake assembly in accordance with one embodiment of the present development.
Figure 4:
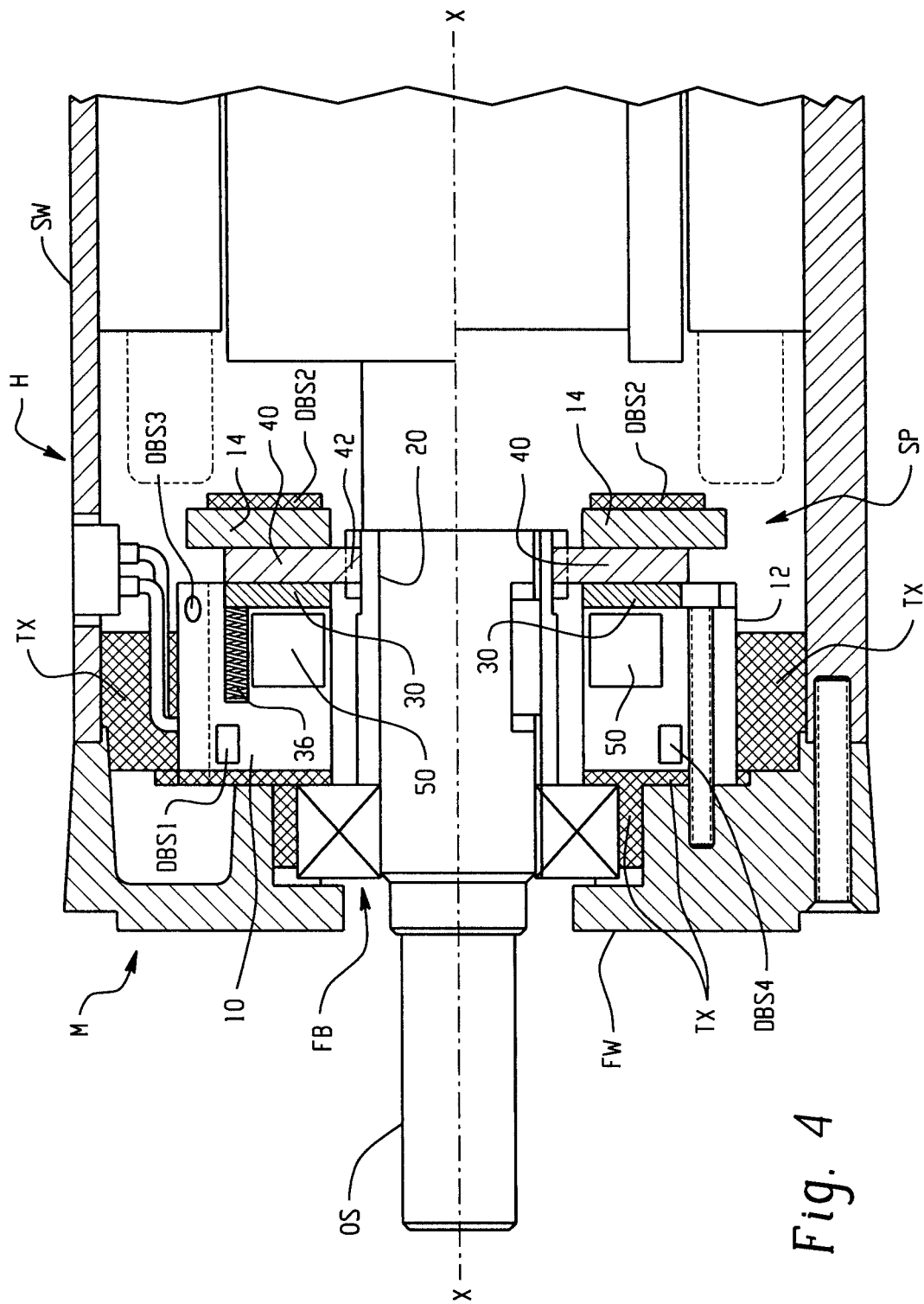
FIG. 4 is a partial section view of a motor including a brake assembly, corresponding to FIG. 3.

FIG. 3 shows a motor M such as a servo motor or other type of motor including a brake assembly BA in accordance with one aspect of the present development. Like components of the motor M relative to the above-described motor M' are identified with like reference characters that omit the primed (') designation and, in some cases, such like components are not described again here, in which case the above-description applies unless otherwise shown and/or described herein. FIG. 4 is an enlarged, partial section view of a front end of the motor M of FIG. 3. The motor M is described and shown herein as a servo motor, but it can be any other type of motor according to the present development.

As shown in FIGS. 3 and 4, the illustrated motor M optionally differs from the motor M' in that the brake assembly BA is located in the front region FR of the motor housing H instead of the rear region RR, although the motor M can alternatively include the brake assembly BA in the rear region RR of the motor housing H, or the brake assembly BA can be located external to motor housing H. In particular, the brake assembly BA is located in the front region FR of the motor housing H, between the front bearing FB and the stator ST and between the midpoint MP of the housing and the front wall FW, wherein the midpoint is defined as the axial location along the axis of rotation X' halfway between the front wall FW and rear wall RW. As such, a maximum distance between the brake assembly BA and the front wall FW is less than a maximum distance between the brake assembly BA and the rear wall RW, and the brake assembly BA is located entirely in the front region FR of the housing H, between the midpoint MP and the front wall FW. This new location for the brake assembly BA moves the large mass of the brake assembly BA closer to the front end FE of the motor to reduce the mass of the rear end RE of the motor, which reduces vibration of the motor housing H and output shaft OS in applications where the rear end RE of the motor is unsupported and cantilevered relative to the mounting flanges MF located at the front end FE of the motor M.

FIG. 4 further shows the brake assembly BA, unlike known motors M' and brake assemblies BA', includes a thermally conductive resilient or compliant pad or layer of material TX such as silicone-based or other elastomeric material located between and filling a space between the brake housing 10 and the motor housing H (at least in the region of the brake housing base 12 as shown) to provide a direct, uninterrupted thermal pathway from the brake housing 10 and to the motor housing H such that heat generated by the brake assembly BA is conducted directly from the brake assembly BA to the motor housing H through the thermal pad layer TX without traversing any insulative air gaps or spaces, and the large mass and surface area of the metal housing H conducts heat efficiently to the surrounding ambient atmosphere as a heat-sink. If desired, cooling fins or other surface area enlargements can be included on the walls FW,RW,SW of the motor housing H to improve transfer of heat from the housing H to the ambient air. The thermally conductive pad material TX can also be located between the backing plate 14 of the brake assembly BA and an adjacent part of the motor housing H and/or other components located in the motor housing H to provide an additional uninterrupted thermal pathway from the backing plate 14 to the motor housing H. The thermally conductive resilient pad TX is also preferably located between and fills the space between the brake housing base 12 and the front bearing FB to provide a direct uninterrupted thermal pathway between the brake housing and the front bearing FB, to transmit heat from the brake housing base 12 to the front bearing FB, and from the front bearing FB to the motor housing H, preferably with thermal pad material TX also located between the front bearing FB and the housing H. In all cases, the thermally conductive pad TX provides a direct, uninterrupted thermal conduction pathway between the brake assembly housing 10 and the motor housing H, front bearing FB, and/or other adjacent components or structures located in the motor housing H. The thermally conductive pad material TX is resiliently compliant to fills any air gaps between the brake assembly housing 10 and the motor housing H, front bearing FB, or other structure in contact with the thermal pad material TX. The front bearing FB also provides a thermal pathway to the output shaft OS such that the output shaft OS also conducts heat away from the brake assembly BA by way of the front bearing FB.

Unlike the motor M', a motor M in accordance with an embodiment of the present development also includes one or more direct brake sensors DBS connected to the brake assembly BA for directly monitoring one or more operating conditions or operating parameters of the brake assembly BA. FIGS. 3 and 4 show a first direct brake sensor DBS1 that comprises a temperature sensor connected to the brake housing 10. A second direct brake sensor DBS2 comprises a strain gauge or other pressure sensor such as a microelectromechanical (MEMS) pressure sensor connected to the backing plate 14 or other part of the housing 10 or brake assembly BA for measuring and sensing the biasing force at which the springs 36 urge the armature 30 and rotor 20 toward and into abutment with the backing plate 14. The third direct brake sensor DBS3 comprises a contact or non-contact switch such as a micro-switch connected to the housing base 12 for detecting movement of the armature 30 and/or rotor 20 to and from their respective engaged and disengaged positions. A fourth direct brake sensor DBS4 comprises an accelerometer or other vibration sensor connected to the housing 10 or other part of the brake assembly BA for measuring vibration in the brake assembly BA. In one example, the fourth direct brake sensor DBS4 comprises a 3-axis accelerometer such as a MEMS vibration sensor, pressure sensor, or the like.

As shown in FIG. 3, the motor M further includes a plurality of sensors including one or more motor vibration sensors MVS1,MVS2 located outside the brake assembly BA, but inside the housing H. The first motor vibration sensor MVS1 is located in the housing space SP, and the second motor vibration sensor MVS2 is connected to the encoder or other position feedback device E. In one example, the motor vibration sensors MVS1,MVS2 each comprise a MEMS vibration sensor or the like, such as a 3-axis accelerometer sensor. In one embodiment, the vibration sensors MVS1,MVS2 include a piezo accelerometer. In another embodiment, one or more of the vibration sensors MVS1,MVS2 comprise acoustic sensors or ultrasonic acoustic sensors such as a microphone or ultrasound sensor located in the housing and providing acoustic data (sonic vibration data or ultrasonic vibration data) to the brake diagnostics system in response to a brake operation (engage or disengage) cycle of the brake assembly BA, wherein said acoustic data is used by the brake diagnostics system BD as described below to assess an operative condition of the brake assembly.

Figure 5:
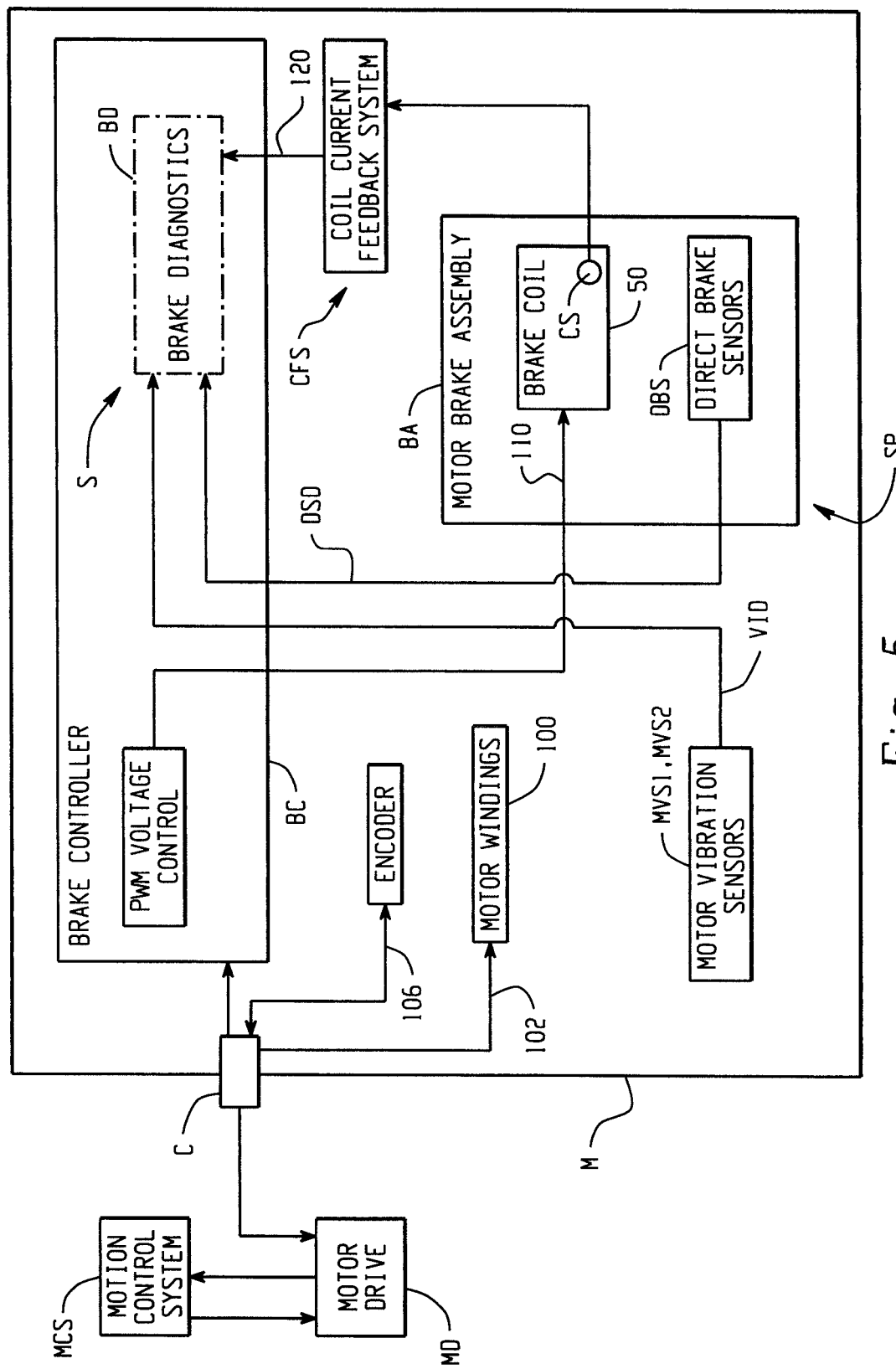
FIG. 5 is a block diagram showing a motor brake monitoring and diagnostic system according to an embodiment of the present development.

FIG. 5 is a block diagram showing a servo motor brake monitoring and diagnostic system S according to an embodiment of the present development. The motor M is operably connected to an electronic motion control system MCS such as an industrial automation control system or other electronic control system or processor. The motion control system MCS is operably connected to a motor drive MD which comprises electronic circuitry for controlling the motor M and brake assembly BA thereof in response to control inputs received from the motion control system MCS. Typically, the motor drive MD selectively energizes the motor windings 100 of the stator ST to drive the rotor RT in clockwise or counterclockwise directions using pulse width modulation (PWM) voltage signals 102 output by the motor drive MD. The motor drive MD receives feedback or error signals 106 from the encoder E or other feedback device indicating the actual angular position of the rotor RT and output shaft OS, and continuously alters the PWM voltage signals 102 in response to the feedback received from the encoder E to reduce the error to zero at which time the output shaft OS is located in the specified angular position input by the motor drive MD.

The motor M comprises a brake controller BC as a part thereof. The brake controller BC comprises one or more electronic circuits for receiving input from the motor drive MD as to the desired state of the brake assembly BA (i.e., brake engaged/"on" or brake disengaged/"off"), and the brake controller BC either energizes or de-energizes the brake electromagnetic coil 50 to control the brake assembly BA accordingly as generally described above for known brake assembly BA, using a coil control voltage signal 110 such as a pulse width modulation (PWM) voltage signal.

Unlike known systems, however, the motor M comprises a brake coil current feedback system CFS including a current sensor CS operatively associated with the brake coil 50 and operably connected to the brake controller BC. The coil current feedback system CFS senses electrical current flowing through the brake coil 50 and provides a coil current feedback signal or level 120 to a brake diagnostics module BD of the brake controller BC. The coil current feedback signal 120 indicates the magnitude or level (amperage) of current flowing in the brake coil 50 such that a magnitude of the coil current feedback signal 120 varies in proportion with the magnitude of current flowing through the brake coil 50. The brake diagnostics module BD compares the magnitude or level of the coil current feedback signal 120 to a known, stored minimum holding current magnitude or level (amperage) required to generate the required electromagnetic force to hold armature 30 to its disengaged position and maintain the armature 30 in its disengaged position or state against the biasing force of the springs 36. If the brake diagnostics module BD determines that the coil current feedback signal 120 indicates a current magnitude flowing in the coil 50 that is greater than the minimum holding current magnitude, the brake controller BC, via pulse-width-modulation (PWM) control, reduces the voltage input 110 to the brake coil 50, which correspondingly reduces the magnitude of electrical current flowing in the coil 50. If the brake diagnostics module BD determines that the coil current feedback signal 120 indicates a current magnitude flowing in the coil 50 that is less than the minimum holding current magnitude, brake controller BC, via PWM control, increases the voltage input 110 to the brake coil 50, which correspondingly increases the electrical current flowing in the coil 50. Using this coil current feedback system CFS and method, the voltage input to the coil 50 is maintained at a minimum level required to hold the armature 30 in its disengaged position, which desirably reduces power consumed by the coil 50 and reduces heat generated by the coil 50.

Figure 6:
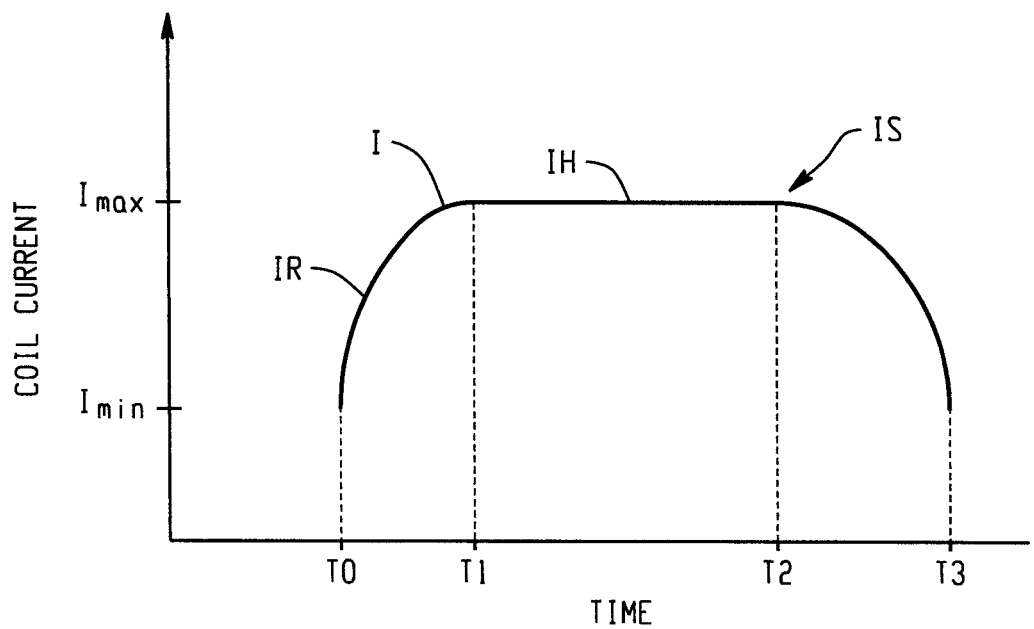
FIG. 6 is a graph that shows brake coil current curve during a normal brake cycle for a properly functioning motor brake.

In addition to monitoring the current flowing in the brake coil 50 by way of the coil current feedback sensor CS, the brake diagnostics module BD further analyzes the current flowing in the brake coil 50 using the coil feedback current 120 to compare the current spectrum of the current flowing in the brake coil 50 with a stored normal or ideal coil current spectrum IS as shown in FIG. 6 such that the coil current feedback signal 120 is compared to at least one stored brake coil current value. The stored ideal coil current spectrum IS indicates a preferred coil current magnitude or level I (amperage) flowing in the brake coil 50 for each moment in time when the brake coil 50 is energized during a brake disengagement cycle, i.e., a brake operation cycle in which the brake assembly is energized to be disengaged or released. The brake diagnostics module BD continuously or periodically compares the stored coil current spectrum IS with the current actually flowing in the brake coil 50 as indicated by the coil current feedback signal 120 when the brake coil 50 is energized to disengage the brake assembly BA. A deviation or discrepancy between the current flowing in the brake coil 50 as indicated by the coil feedback current 120 and the stored current spectrum IS is identified by the brake diagnostics module BD as being degradation and/or malfunction of the brake assembly BA.

FIG. 6 is a graph that shows an ideal coil current spectrum IS during a normal disengagement cycle of the brake assembly BA in which the brake assembly BA changes state from engaged to disengaged, and back to engaged during a brake disengagement cycle time period T0-T3. The ideal current spectrum IS is located in an amperage range defined between a minimum current level $I_{min}$ and a maximum current level $I_{max}$. It can be seen that coil current amperage magnitude I increases regularly over time in a ramp-up time period T0-T1 as indicated at IR when the brake coil 50 is first energized by the coil control voltage to disengage the brake assembly BA. The coil current I is then maintained in a steady state at select holding level or holding magnitude or within a select holding magnitude range during a holding time period T1-T2 during which time the brake coil 50 is energized to maintain the brake armature in its disengaged position. In a shut-off time period T2-T3, the coil current magnitude I drops as the brake coil 50 is de-energized so that the spring(s) 36 overcome the electromagnetic force generated by the brake coil 50 and again engage the brake assembly BA.

As described above, at least during the holding time period T1-T2, the coil current feedback signal 120 is monitored by the brake diagnostics module BD and compared to the ideal current spectrum IS, and the brake controller BC varies the coil control voltage signal 110 input to the brake coil 50 such that the coil current feedback signal 120 is maintained at the select holding magnitude level (or within a select holding magnitude range) IH with a minimum amount of voltage input to the brake coil 50 via pulse width modulation PWM of the coil control voltage 110. This coil current controlled feedback process minimizes the power consumed by the brake coil 50 and thus minimizes the heat generated by the brake coil 50.

Figure 7:
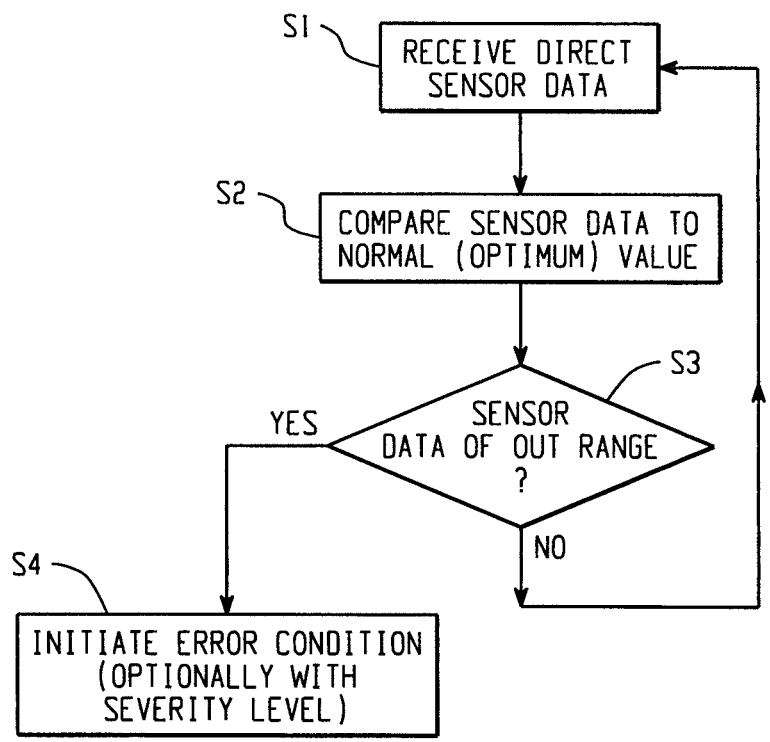
FIG. 7 is a flow chart that shows an example of a process for monitoring brake assembly sensor data according to an embodiment of the present development.

In one embodiment of the present development, the magnitude of the coil current feedback signal 120 is monitored over the brake disengagement cycle time period T0-T3 and the coil current feedback signal magnitude 120 is compared to the normal coil current feedback spectrum IS as shown in FIG. 7. Variations of the coil current feedback signal 120 relative to the normal coil current feedback spectrum IS at a given time in the brake disengagement cycle T0-T3 are used by the brake diagnostics module BD to indicate performance degradation and/or malfunction of the brake assembly BA. For example, a coil current feedback signal 120 lower than the normal coil current feedback spectrum IS at a certain time between T0 and T3 is determined by the brake diagnostics module BD to be due to increased resistance in the brake coil 50 due to a break or other problem with the windings of the brake coil 50. A coil current feedback signal 120 higher than the normal coil current feedback spectrum IS at a certain time between T0 and T3 is determined by the brake diagnostics module BD to be due to decreased resistance in the brake coil 50 due to a short or other problem with the windings of the brake coil 50, or due to increased friction or drag during movement of the armature 40 from its engaged position to its disengaged position. In general, when the brake diagnostics module BD detects deviations of the coil current feedback signal 120 relative to the normal or ideal coil current feedback spectrum IS by a select amount, the brake diagnostics module BD assess such variations as a fault or error condition of a severity that varies correspondingly with the magnitude of the variation of the coil current feedback signal 120 relative to the normal coil current feedback spectrum CCFS. In one embodiment, the coil current feedback spectrum IS is statistically sampled and monitored for long-term trend analysis to detect changes in the current feedback spectrum over time.

With continuing reference to FIG. 5, the motor M includes one or more direct brake sensors DBS connected to the brake assembly BA for directly monitoring one or more operating conditions or operating parameters of the brake assembly BA. In use, each direct brake sensor DBS continuously or periodically provides direct sensor data DSD to the brake diagnostics module BD indicating the magnitude, state, or condition being sensed, including temperature of the brake assembly BA, biasing force or pressure exerted by the biasing springs 36 on the armature 30, and/or a position of the armature 30 and/or rotor 40. The brake diagnostics module BD compares the received direct sensor data DSD to stored normal or optimum target values or stored normal or optimum target ranges that indicate a normal or optimum value or normal or optimum range for each parameter being sensed by a direct brake sensor DBS. If the direct sensor data DSD differs from the stored target value or range, the brake diagnostics module BD initiates an error condition in the brake controller BC. The brake diagnostics module BD preferably assesses the severity of the error condition based upon the amount by which the relevant direct sensor data DSD varies from its target value or range, and the brake diagnostic module BD preferably also assigns a severity level to the error condition. The brake controller BC communicates the error condition from the brake diagnostics module BD to the motor drive MD for use by the motor drive.

As shown in FIG. 7, in a step S1 the brake diagnostics module BD receives the direct sensor data DSD. In a step S2, the brake diagnostics module BD compares the direct sensor data DSD received in step S1 to normal or optimum values stored by the brake diagnostics module BD. In a step S3, the brake diagnostics module determines if the direct sensor data DSD is out of range, where out of range means greater than a maximum value, less than a minimum value, or otherwise not equal to a select optimum value, or outside a select optimum range of values. If the direct sensor data DSD is out of range, the brake diagnostics module BD initiates an error condition in a step S4. Otherwise, if the steps S2 and S3 determine that direct sensor data DSD is in the desired range, the process repeats with step S1 without initiating an error condition.

For example, direct sensor data DSD indicating a temperature or vibration in the brake assembly BA that is out of range will be flagged by the brake diagnostics module BD as an error, and the brake diagnostics module BD optionally also assigns a severity level to the error that increases with the magnitude that the direct sensor data DSD is outside of range. Upon receiving the error, the motor drive MD will either stop the motor M or adjust use of the motor M to lower the brake temperature or brake vibration to minimize the condition causing the error, depending upon the severity of the error, and/or the motor drive MD can communicate the error upstream to the motion control system MCS for providing output to a user to check the motor M.

Similarly, direct brake sensor data DSD that indicates that the biasing force of the spring(s) 36 has dropped below a minimum level is flagged by the brake diagnostics module MD as an error to be monitored based upon wear of the brake assembly BA over time.

In another example, direct sensor data DSD that indicates the movement of the armature and/or brake rotor 20 from their respective disengaged positions to their respective engaged positions, or from their respective engaged positions to their respective disengaged positions, is used by the brake diagnostics module in conjunction with time data in order for the brake diagnostics module BD to determine if the time for the armature 30 and/or rotor 20 to move from the engaged position to the disengaged position, or from the disengaged position to the engaged position, is greater than an optimum time limit and/or greater than a maximum time limit known and stored by the brake diagnostics module BD. If the time for such movement of the armature 30 and/or rotor 20 is greater than the optimum time limit but less than the maximum time limit, the brake diagnostics module BD initiates a warning condition for a deteriorating condition of the brake assembly BA. If the time for such movement of the armature 30 and/or rotor 20 is greater than the maximum time limit the brake diagnostics module BD initiates an error condition for a failure of the brake assembly BA, and the motor drive MD stops the motor M.

As shown in FIG. 3, the motor M further includes one or more motor vibration sensors MVS1,MVS2 located outside the brake assembly BA, but inside the motor housing H. In the example of FIG. 3, the first motor vibration sensor MVS1 is located in the housing space SP, and the second motor vibration sensor MVS2 is connected to the encoder E. In one example embodiment, the motor vibration sensors MVS1,MVS2 (sometimes generally referred to herein as "vibration sensor(s) MVS") each comprise 3-axis MEMS accelerometer sensors, but any other suitable vibration sensors can be used. As noted above, one or more of the motor vibration sensors MVS1,MVS2 is optionally provided as an acoustic sensors or ultrasonic acoustic sensors such as a microphone or ultrasound sensor located in the housing and providing acoustic data (sonic vibration data or ultrasonic vibration data) to the brake diagnostics module BD in response to a brake operation (engage or disengage) cycle of the brake assembly BA, wherein said acoustic data is used by the brake diagnostics module BD as described herein with reference to vibration data in general to assess an operative condition of the brake assembly. The vibration sensors MVS are oriented in such a way to detect vibration in axial, radial, and rotational directions on the motor M. Each vibration sensor MVS is operably connected to the brake diagnostics module BD and provides vibration input data VID (which can be sonic or ultrasonic data) to the brake diagnostics module BD that indicates the magnitude and preferably also the axis (i.e., x, y, or z axis) of the vibration sensed by the vibration sensor MVS1,MVS2.For example, movement of the brake rotor 40 during brake engagement or disengagement can be detected by sensors MVS oriented to detect axial vibration, while rubbing or dragging of the brake rotor 40 on the armature 30 or backing plate 14 can be detected by sensors MVS oriented to detect rotational vibration.

Figure 8:
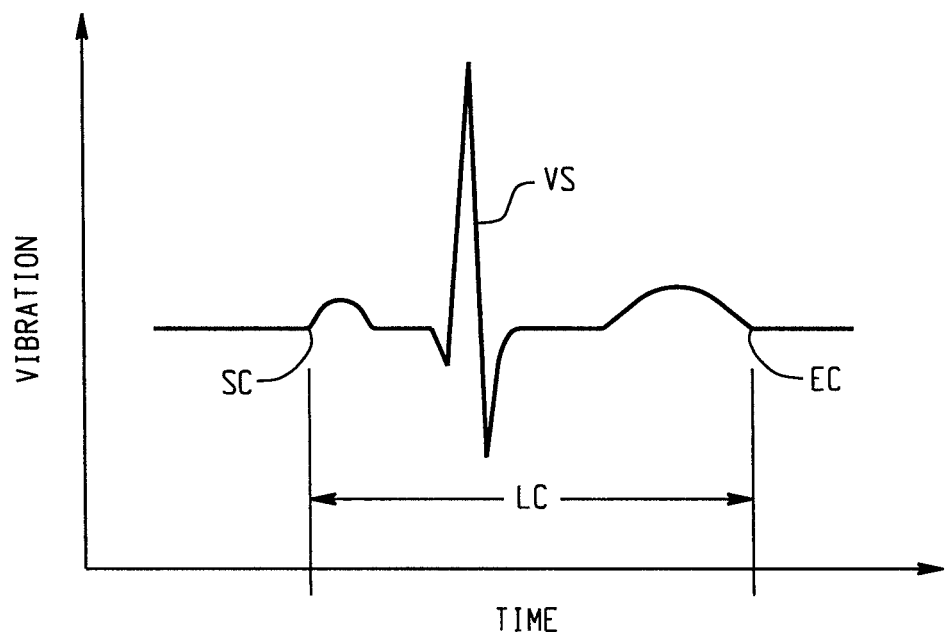
FIG. 8 is a graph of motor vibration over time and illustrates a normal or ideal vibration data spectrum VS for a brake engagement or disengagement cycle.
Figure 9:
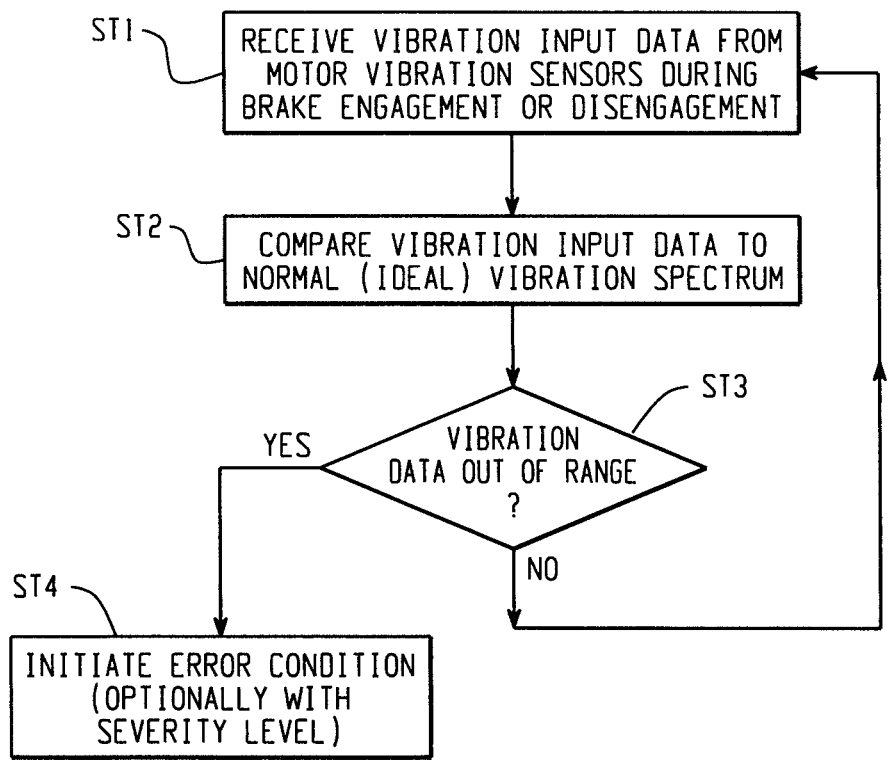
FIG. 9 is a flow chart that shows an example of a process for monitoring motor vibration data according to an embodiment of the present development.

In one embodiment, as shown in FIG. 9, the vibration sensors MVS1,MVS2 detect vibration in the motor M in response to movement of the brake armature 30 and brake rotor 40 during engagement and disengagement of the brake assembly BA, and provide such vibration data to the brake diagnostics module BD in a step ST1. FIG. 8 shows a graph of motor vibration over time and illustrates a normal or ideal vibration data spectrum VS (which can be an acoustic spectrum defined by sonic or ultrasonic vibration data) for a brake engagement cycle or disengagement cycle (a brake engagement cycle or a brake disengagement cycle is generally referred to as a "brake operation cycle") for a healthy brake assembly, i.e., a brake assembly in a first (healthy or acceptable) operative condition or first (healthy or acceptable) operative state. According to the present development, such a normal vibration spectrum VS is stored in the brake diagnostics module BD for the brake engagement cycle and/or the brake disengagement cycle, and the actual vibration data spectrum defined by the actual vibration input data VID input to the brake diagnostics module BD during use of the motor M for a brake engagement cycle and/or brake disengagement cycle (i.e., a brake operation cycle) is compared to the corresponding normal vibration spectrum VS for the brake engagement or brake disengagement cycle in a step ST2. As noted, the actual vibration data VID input to the brake diagnostics module BD can be sonic or ultrasonic vibration data that defines an actual acoustic spectrum. A step ST3 determines if the vibration input data VID is out of range, such as when the vibration input data VID indicates that the motor M is vibrating more than a maximum allowed vibration amount at a given time in the brake engagement or brake disengagement cycle. When the vibration input data VID is out of range, i.e., the vibration input data VID deviates from the normal vibration spectrum representing the first (normal) operative state or first (normal) operative condition of the brake assembly by a select amount, the brake diagnostics module BD determines that the brake assembly is in a second (unhealthy or deficient) operative state or second (unhealthy or deficient) operative condition that differs from the first operative state or first operative condition and initiates an error condition in a step ST4 in which it identifies such deviation as an error and optionally also assigns a severity level to the error that varies proportionally with the magnitude of the deviation, and the motor controller MC outputs such error data to the motor drive MD which can communicate the error to the motion control system MCS to inform a user of the system that the health, i.e., the operative condition or operative status, of the brake assembly BA is deteriorating or that the brake assembly BA has failed. Otherwise, if the vibration input data VID is determined in step ST3 to be in range, the process restarts at step ST1 for the next brake engagement and or disengagement cycle for the brake assembly BA. Pattern matching techniques can be used in the brake diagnostics module BD to analyze the vibration spectrum defined by the feedback data VID by comparing same with plurality of known vibration data spectrum patterns VS to classify a brake assembly BA as healthy, fair or faulty depending upon the closest pattern matched. The select known plurality of vibration data patterns VS can be preloaded into and/or learned in an adaptive fashion by the brake diagnostics module BD.

As shown in FIG. 8, the normal or ideal vibration spectrum VS has a start SC and an end EC corresponding to the start and end, respectively, of the brake engagement and/or disengagement cycle. The armature 30 moves axially during the time period between the start SC of the cycle and the end EC of the cycle. In another embodiment, the brake diagnostics module MD monitors the start SC and the end EC of the vibration input data VID during a brake engagement and/or disengagement cycle and determines the length (time) of the brake engagement/disengagement cycle LC based upon the time difference between the end of the cycle EC and the start of the cycle SC. Here, again, it is noted that the vibration input data can be sonic or ultrasonic vibration data. The length of the cycle LC (referred to as the actual brake cycle time) is determined by the brake diagnostics module BD and is compared to a corresponding stored maximum brake engagement cycle or disengagement cycle length (time) of the normal vibration spectrum VS (referred to as the stored maximum brake cycle time) and/or is compared to the brake cycle length LC of one or more previous brake engage/disengage cycles. The brake diagnostics module BD identifies as an error any out of range condition such as when brake engagement or brake disengagement cycle with a cycle length LC that exceeds the stored maximum brake cycle length for engagement or disengagement, respectively, and also optionally identifies a low severity error when the brake engagement/disengagement cycle length LC increases relative to one or more previous brake engagement/disengagement cycles by more than a select maximum amount. Undesired lengthening of the brake cycle length LC is used by the brake diagnostic module BD to predict an impending failure of the brake assembly BA and/or to identify the need for preventative maintenance of the brake assembly BA, and the brake diagnostics module BD provides output data to the motor drive MD and motor control system MCS concerning the impending failure and/or need for preventative maintenance so that the motor M can be shutdown and/or serviced by an operator.

Although the brake assembly BA as shown herein is located inside the motor housing H, it should be recognized that the brake assembly BA can be provided external to the motor housing H without departing from the overall scope and intent of the present development.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather restrictive sense.

The invention claimed is:

1. A motor comprising:
 a housing including a rotor and stator;
 a brake assembly adapted to selectively restrain rotation of the rotor, said brake assembly spring-biased into a normally-engaged condition in which said brake assembly restrains rotation of the rotor;
 a brake controller comprising a brake diagnostics system;
 at least one vibration sensor located in the housing, wherein said at least one vibration sensor senses vibrations occurring in said housing during a brake operation cycle of the brake assembly and outputs vibration data describing said vibrations to the brake diagnostics system for use by the brake diagnostics system to assess an operative condition of the brake assembly;
 said brake assembly further comprising a brake coil that is selectively energized by said brake controller by passing an electrical current through said coil to disengage said brake assembly to allow rotation of said rotor;
 said motor further comprising a brake coil current feedback system operatively associated with the brake coil and adapted to sense a magnitude of the electrical current flowing through the brake coil and provide a coil current feedback signal to said brake diagnostics system, wherein said coil current feedback signal varies in relation to said magnitude of the electrical current flowing through the brake coil and said brake diagnostics system assesses the operative condition of the brake assembly based at least partially upon said coil current feedback signal.

2. The motor as set forth in claim 1, wherein:
 said brake diagnostics system comprises a stored normal vibration spectrum for the brake operation cycle, said stored normal vibration spectrum representing vibration of said motor over time during said brake operation cycle for the brake assembly in a first operative condition; and,
 said brake diagnostics system compares said vibration data output by the at least one vibration sensor to said stored normal vibration spectrum to determine the operative condition of said brake assembly.

3. The motor as set forth in claim 1, wherein:
 said brake diagnostics system comprises a plurality of stored normal vibration spectrum patterns for the brake operation cycle, wherein each of said stored patterns represents vibration of said motor over time during said brake operation cycle for the brake assembly in a respective plurality of different operative conditions; and,
 said brake diagnostics system compares said vibration data output by the at least one vibration sensor to said plurality of stored vibration spectrum patterns using pattern matching, and wherein said brake diagnostics system determines the operative condition of the brake assembly based upon a closest match between the vibration data output by the at least one vibration sensor and one of said plurality of stored vibration spectrum patterns.

4. The motor as set forth in claim 1, wherein said vibration data output by the at least one vibration sensor to the brake diagnostics system represents at least a start of the brake operation cycle and at least an end of the brake operation cycle, and wherein said brake diagnostics system determines an actual brake cycle time defined by a length of time between said start and said end of the brake operation cycle and said brake diagnostics system compares the actual brake cycle time to a stored brake cycle time to determine the operative condition of the brake assembly.

5. The motor as set forth in claim 4, wherein said operative condition of the brake assembly is determined by the brake diagnostics system to be worse that a normal operative condition of the brake assembly if the actual brake cycle time is greater than the stored brake cycle time.

6. The motor as set forth in claim 1, wherein said vibration data output by the at least one vibration sensor to the brake diagnostics system represents at least a start of the brake operation cycle and at least an end of the brake operation cycle, and wherein said brake diagnostics system determines an actual brake cycle time defined by a length of time between said start and said end of the brake operation cycle and said brake diagnostics system compares the actual brake cycle time to a previous actual brake cycle time determined by the brake diagnostics system to assess the operative condition of the brake assembly.

7. The motor as set forth in claim 6, wherein said operative condition of the brake assembly is determined by the brake diagnostics system to be worse that a normal operative condition of the brake assembly if the actual brake cycle time is greater than the previous actual brake cycle time by more than a select percentage.

8. The motor as set forth in claim 1, wherein a magnitude of the coil current feedback signal varies depending upon the magnitude of the electrical current flowing through the brake coil.

9. The motor as set forth in claim 8, wherein said brake controller varies a voltage input to the brake coil in response to said magnitude of the coil current feedback signal.

10. The motor as set forth in claim 9, wherein said brake controller reduces the voltage input to the brake coil when said coil current feedback signal indicates that the magnitude of the electrical current flowing through the brake coil is greater than a minimum holding current value required to maintain the brake assembly in a disengaged position.

11. The motor as set forth in claim 8, wherein the brake diagnostics system compares the coil current feedback signal to at least one stored brake coil current value to determine the operative condition of the brake assembly.

12. The motor as set forth in claim 11, wherein the brake diagnostics system compares the magnitude of the coil current feedback signal to at least one of: (i) a stored brake coil current maximum magnitude value; and, (ii) a stored brake coil current minimum magnitude value.

13. The motor as set forth in claim 11, wherein:
said brake diagnostics system includes a stored ideal coil current spectrum that indicates a preferred coil current magnitude flowing in the brake coil at all times during a brake operation cycle to disengage and reengage the brake assembly when the brake assembly is in a first operative condition; and,
the brake diagnostics system compares the coil current feedback signal to the stored ideal current spectrum at corresponding times of said brake operation cycle to determine the operative condition of the brake assembly.

14. The motor as set forth in claim 13, wherein the brake diagnostics system determines that the brake assembly is in a second operative condition that differs from the first operative condition when the coil current feedback signal differs from the stored ideal coil current spectrum at said corresponding times of said brake operation cycle.

15. The motor as set forth in claim 6, further comprising at least one direct brake sensor associated with the brake assembly for directly measuring at least one operating parameter of the brake assembly, wherein said at least one direct brake sensor comprises at least one of a temperature sensor, a vibration sensor, a position sensor, a movement sensor, a pressure sensor.

16. The motor as set forth in claim 1, wherein said vibration sensor comprises an acoustic sensor and said vibration data comprises acoustic data, and wherein the acoustic data is used by the brake diagnostics system to assess the operative condition of the brake assembly.

17. A motor comprising:
a housing including a rotor and stator;
a brake assembly adapted to restrain rotation of the rotor, said brake assembly comprising a brake coil;
a brake controller comprising a brake diagnostics system;
a brake coil current feedback system operatively associated with the brake coil and adapted to sense an electrical current flowing through the brake coil, wherein said brake coil current feedback system provides a coil current feedback signal to the brake diagnostics system, and wherein a magnitude of the coil current feedback signal indicates a magnitude of the electrical current flowing through the brake coil;
wherein said brake diagnostics system uses the magnitude of the coil current feedback signal to at least one of: (i) determine an operative condition of the brake assembly based upon the magnitude of the coil current feedback signal during a brake operation cycle; (ii) reduce a voltage input to the brake coil when the coil current feedback signal indicates that more than a minimum holding current is flowing in the brake coil, wherein said minimum holding current represents a minimum current magnitude flowing in the brake coil required to maintain the brake assembly in a disengaged state.

18. The motor as set forth in claim 17, further comprising:
a resilient layer of thermally conductive material located between the brake assembly and the housing of the motor, said resilient layer of thermally conductive material providing a continuous, uninterrupted thermal pathway between the brake assembly and the housing of the motor.

19. The motor as set forth in claim 1, wherein said housing of the motor comprises a front wall, a rear wall, and a side wall, wherein said side wall extends between and interconnects said front wall and said rear wall, said front wall, said rear wall, and said side wall defining an interior space in which an output shaft is rotatably supported by a front bearing and a rear bearing, wherein said output shaft extends through said front wall such that part of said output shaft is located external to said interior space, said housing comprising a mid-point located halfway between said front wall and said rear wall such that a front region of said housing is defined between said front wall and said mid-point, and a rear region of said housing is defined between said rear wall and said mid-point, wherein said front bearing and said brake assembly are located in said front region of said housing and said rear bearing is located in said rear region of said housing.

20. A motor comprising:
a motor housing comprising a front wall, a rear wall, and a side wall, wherein said side wall extends between and interconnects said front wall and said rear wall, wherein said front wall, said rear wall, and said side wall define an interior space;
said motor comprising a rotor and a stator located in said interior space, wherein said stator is fixed in position relative to said housing and said rotor is adapted to rotate relative to said stator;
a front bearing assembly and a rear bearing assembly located in said interior space;
an output shaft operably connected to said rotor and rotatably supported relative to said housing by said front bearing assembly and said rear bearing assembly, wherein said output shaft projects through said front wall of said housing such that part of said output shaft is located external to said interior space of said housing;
said housing comprising a mid-point located halfway between said front wall and said rear wall such that a front region of said housing is defined between said front wall and said mid-point, and a rear region of said housing is defined between said rear wall and said mid-point, wherein said front bearing assembly and a brake assembly are located in said front region of said housing and said rear bearing assembly is located in said rear region of said housing.

* * * * *